Dec. 3, 1963      S. BACK      3,112,836
REMOVABLE CARGO BOX FOR TRUCKS OR TRAILERS
Filed Nov. 26, 1962      2 Sheets-Sheet 2

INVENTOR
SAMUEL BACK
BY Maybee & Legris
ATTORNEYS

3,112,836
REMOVABLE CARGO BOX FOR TRUCKS OR TRAILERS
Samuel Back, 165 Degrassi St., Toronto, Ontario, Canada
Filed Nov. 26, 1962, Ser. No. 240,114
Claims priority, application Canada Nov. 30, 1961
4 Claims. (Cl. 214—515)

This invention relates to removable cargo boxes for trucks or trailers of the type in which the body is lifted off the chassis of a truck or trailer by means of jacks permanently mounted on the body, whereby the chassis may be pulled out from under the body and subsequently back beneath a second body which is then lowered onto the chassis. The second body may be carted away while the first one is being unloaded and reloaded thus avoiding extensive periods of immobility to the truck and inactivity to the driver.

In a known construction, jack supporting members are connected to the jacks at their upper ends and engage bearings mounted on the underside of the body frame. The jack supporting members are in the form of flat plates having flanges which engage in corresponding guides in bearings mounted on the underside of the body.

A disadvantage of this construction is that when a jack is moved inwardly to inoperative or non body supporting position, the flat jack supporting plate comes into contact with the underside of the frame when the jack is swung up beneath the body of the truck, with the result that the jack cannot be swung up to a position substantially at right angles to its dependent position, or in other words, cannot be swung up substantially parallel to the underside of the truck body and thus well clear of the road.

According to this invention, the upper surface of the jack supporting member is convexly curved and the under surface of the bearing member is similarly concavely curved, the two surfaces when in register forming a segmental bearing for the jack in its outwardly extended load bearing position. When the jack is moved inwardly out of contact with the bearing member and swung up beneath the truck body, the curvature of the upper surface of the jack supporting member permits it to clear the underside of the frame of the body allowing the jack to swing substantially 90° to a position substantially parallel with the underside of the body.

Figure 1:
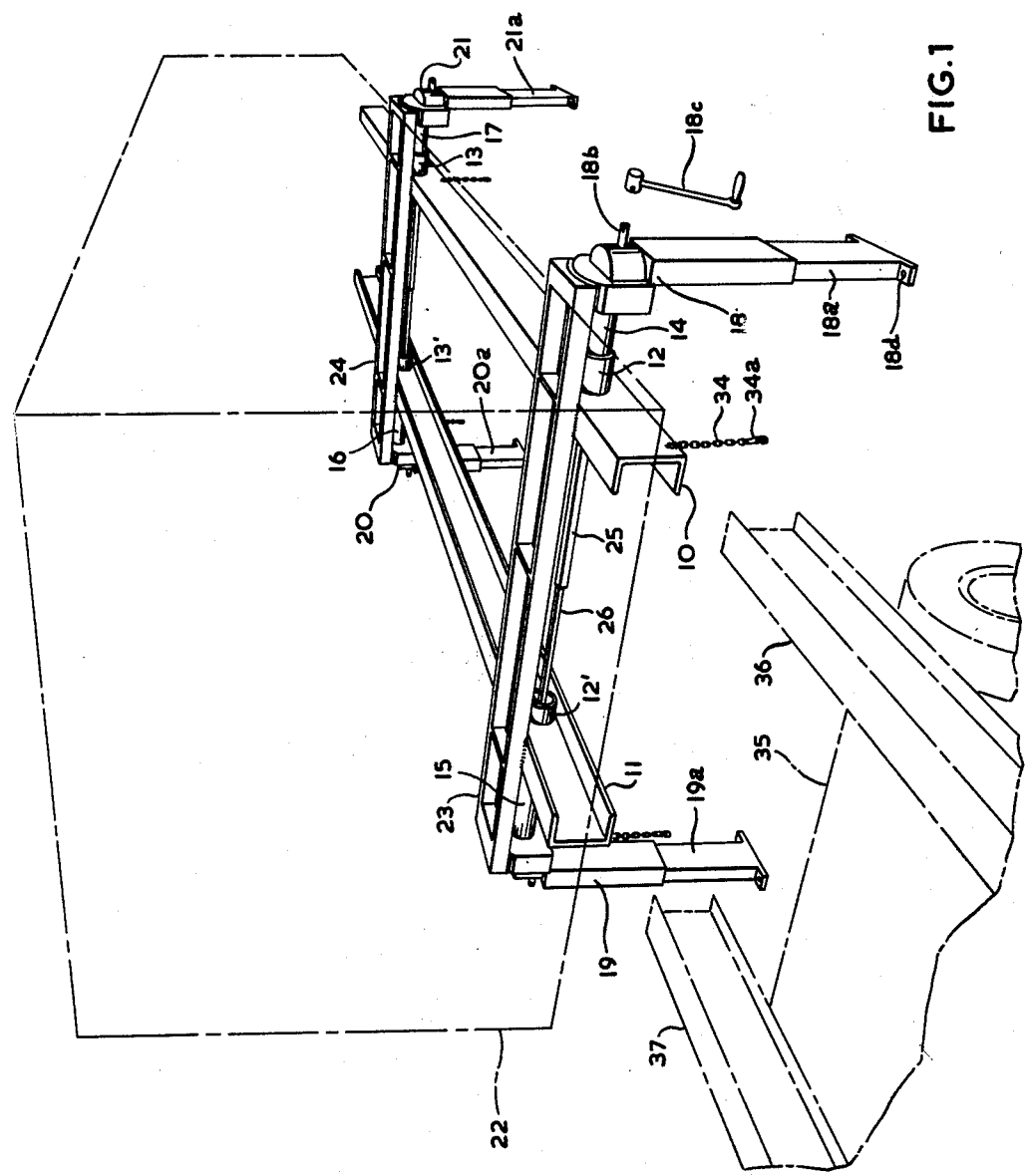
Figure 2:
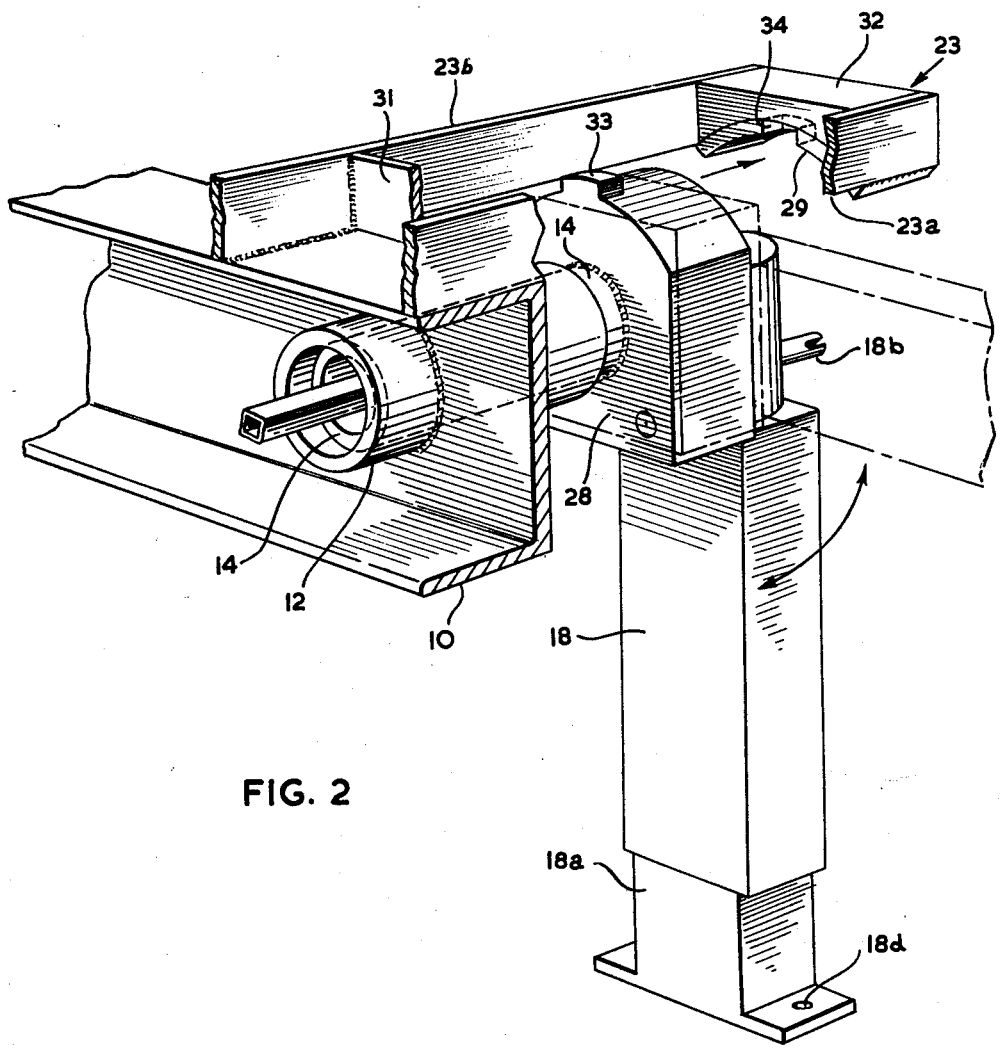

The invention is hereinafter more particularly described and illustrated in the annexed drawings in which:

FIGURE 1 is a perspective view of the body frame showing the cargo box and truck in phantom lines; and FIGURE 2 is an enlarged perspective view of the body frame showing the jack in its inner position and in its raised position in phantom lines.

The rectangular body frame comprises two longitudinal frame members 10 and 11 and two pairs of transverse members 23 and 24. Located below the transverse frame members and extending through and secured in the longitudinal frame members are tubular members 12 and 12' and 13 and 13' adapted to receive stub shafts 14, 15, 16 and 17 which are adapted to telescope in the transverse tubular members. It will be obvious that instead of separate tubular members 12 and 12', and 13 and 13' they may be continuous extending between the longitudinal frame members. To the other end of the stub shafts are secured jacks 18, 19, 20 and 21.

In describing details of the construction and mounting of the jacks reference will generally be made only to jack 18, it being understood that a jack is located adjacent each corner of the frame and the construction of all jacks is the same. Jack 18 is a standard type automobile jack having an extensible leg 18a which may be extended and contracted by rotating shaft 18b by means of detachable handle 18c.

The jack may be moved inwardly and outwardly relative to the longitudinal body frame member 10 merely by pushing it in or out whereby the stub shaft telescopes in or out of the tubular member 12. Secured to jack 18 and extending through tubular member 12 is a hollow rectangular shaft 25. Secured to jack 19 and extending through tubular member 12' is a rectangular shaft 26 adapted to slide in shaft 25. Thus, when one of the jacks is swung up or down, the jack on the other side of the body will be swung simultaneously. A similar arrangement enables the jacks 20 and 21 to be swung simultaneously.

The cargo box 22 shown in phantom lines in FIGURE 1 is permanently secured to the transverse frame members 23 and 24. The truck or trailer chassis 35 also shown in phantom lines in FIGURE 1 includes longitudinal frame members 36 and 37. When the jacks are in outer position and extended as shown in FIGURES 1 and 2, the frame of the body will be raised sufficiently above the chassis of the truck or trailer for the truck to be backed beneath the body with longitudinal frame members 36 and 37 of the truck chassis beneath the longitudinal frame members 10 and 11 respectively of the body. By retracting the legs 18a and 19a, 20a and 21a of the jacks the body frame is lowered onto the truck frame and may be secured thereto in any convenient way.

This invention deals primarily with segmental bearing means for supporting the jacks whereby they will hold the body strongly and firmly in raised position and may be swung up substantially parallel with the underside of the truck body when the body is in position on the truck chassis. These means will now be more particularly described, with particular reference to jack 18.

Secured to the upper end of the jack 18 is a jack supporting member 28 which may form part of the upper end of the jack or may be separately secured thereto. This jack supporting member 28 is provided with an upper convex surface whose centre of curvature, is the centre line of the stub shaft 14. The jack supporting member 28 is adapted to engage a bearing member 29 which is concavely curved on the same center of curvature as the jack supporting member 28, so that when the jack is in its outer load supporting position its upper curved surface engages the under segmental surface of the bearing 29.

The bearing member 29 is supported on transverse frame member 23 in the following manner. Transverse frame member 23 is formed of two vertical bars 23a and 23b placed on their edges and facing one another. They are welded to the upper faces of the longitudinal frame members 10 and 11. Cross bars 31 and 32 extend between bars 23a and 23b. Cross bar 32 is preferably substantially the same width as the bearing member 29 and concavely curved to receive and support bearing member 29 which may in practice be integral with bar 32. A stop 33 on jack supporting member 28 is adapted to engage in the recess 34 in bearing 29 to prevent relative rotation of the jack supporting member and the bearings and to ensure that the jack is in vertical position when in its outer bearing engaging location.

When the body is lowered onto a truck or trailer chassis the leg 18a is retracted to the position shown in FIGURE 2, and in this position the jack may be moved to its inner location shown in FIGURE 2. In this location, the jack supporting member 28 is below the space or gap between transverse members 23a and 23b and cross bars 31 and 32. By reason of the curvature of the surface of the jack supporting member 28, the jack may be rotated freely without striking the frame members 23a and 23b to the position shown in phantom lines in FIGURE 2 substantially parallel to the underside of the truck body. When in this position it may be secured by chain 34 attached to frame 10, which has its hook 34a adapted to hook into hole 18d in the foot of the jack.

What I claim as my invention is:

1. A removable body for a truck or trailer chassis comprising a rectangular body frame, four jacks, one located adjacent each corner of the frame, mechanism for extending the jacks to raise the removable body off the chassis, means on the frame for supporting at least the two jacks at the forward end of the truck whereby they may be moved inwardly relative to the sides of the body to an inoperative position and outwardly to a body supporting position which permits the chassis to pass between the jacks, each said supporting means comprising a jack supporting member to which the jack is connected at its upper end, a rotatable shaft journalled in the body frame on which the jack supporting member is mounted, and a segmental bearing fixed to the underside of the body frame which engages the jack supporting member in its outer body supporting position, the upper engaging surface of the jack supporting member being convexly curved and the lower engaging segmental surface of the bearing being concavely curved around the same center of curvature.

2. A removable body for a truck or trailer chassis as claimed in claim 1 including a pair of spaced apart transverse frame members connected by two or more cross bars, the segmental bearing extending between the transverse frame members at their outer ends, and the space between the transverse frame members inwardly of the bearing being open and unobstructed to permit the jack to be swung upwardly beneath the truck body.

3. A removable body for a truck or trailer chassis as claimed in claim 1 including a stop means on the bearing member and the supporting member to limit the outer movement of the jack supporting member and prevent rotation thereof relative to the bearing when the jack is in its body supporting position.

4. A removable body for a truck or trailer chassis comprising a rectangular body frame formed of longitudinal frame members and pairs of transverse frame members supported on the longitudinal frame members and extending beyond them on each side of the body, tubular members extending transversely of the longitudinal members beneath the transverse frame members; four jacks, one located beneath each transverse frame member adjacent its outer end, four stub shafts, one connected to and supporting each jack, each stub shaft rotatably mounted in one of the transverse tubular members, a concavely curved segmental bearing extending between each pair of transverse frame members at their outer ends, a jack supporting member convexly curved on its upper surface on the same center of curvature as the segmental bearing and adapted to engage the segmental bearing surface when the jack is in its outer body supporting position, and a stop means on the bearing and the supporting member to limit the outer movement of the jack supporting member and prevent rotation thereof relative to the bearing when the jack is in its body supporting position, said jack being swingable in its inner inoperative position upwardly beneath the body.

References Cited in the file of this patent
UNITED STATES PATENTS

| | | |
|---|---|---|
| 1,290,694 | Angle | Jan. 17, 1919 |
| 3,073,467 | Parks | Jan. 15, 1963 |